United States Patent [19]

Gonsior

[11] Patent Number: 4,920,784
[45] Date of Patent: May 1, 1990

[54] APPARATUS WITH AN INITIATOR

[75] Inventor: Wolfgang Gonsior, Lindau-Bodolz, Fed. Rep. of Germany

[73] Assignee: Gulde Regelarmaturen GmbH & Co. KG, Ludwigshafen, Fed. Rep. of Germany

[21] Appl. No.: 292,854

[22] Filed: Jan. 3, 1989

[30] Foreign Application Priority Data

Dec. 31, 1987 [DE] Fed. Rep. of Germany ....... 3744629

[51] Int. Cl.⁵ .......................................... G01D 13/26
[52] U.S. Cl. .................................. 73/1 E; 200/56 R
[58] Field of Search ...................... 73/865.9, 1 D, 1 E; 29/595, 622; 200/56 R, 56 A, 308; 356/375; 250/231 SE

[56] References Cited

U.S. PATENT DOCUMENTS

| 2,492,408 | 12/1949 | Willcox | 200/56 R |
| 2,673,907 | 3/1954 | Purdy | 200/56 R |
| 2,880,286 | 3/1959 | Ferris | 200/56 R |
| 3,902,063 | 8/1975 | Delsch et al. | 250/231 SE |
| 4,722,705 | 2/1988 | Rawlings | |
| 4,727,227 | 2/1988 | Faini | 200/56 R |

FOREIGN PATENT DOCUMENTS

| 417935 | 8/1925 | Fed. Rep. of Germany | 200/308 |
| 3133061 | 3/1983 | Fed. Rep. of Germany | |
| 3536833 | 10/1985 | Fed. Rep. of Germany | |
| 3542563 | 12/1986 | Fed. Rep. of Germany | |

Primary Examiner—Robert R. Raevis
Attorney, Agent, or Firm—Foley & Lardner, Schwartz, Jeffery, Schwaab, Mack, Blumenthal & Evans

[57] ABSTRACT

An apparatus with an initiator for detecting the rotational position of a shaft (10) comprising a housing (2) containing an electric sensor element (14) and a movable revolving body (22) fastened on the shaft (10). The apparatus achieves a simple and functionally reliable alignment of the revolving body (22) with respect to the sensor element (14) in order to facilitate assembly or adjustment at low cost. The revolving body (22) is rotationally fixed to the shaft (10) by means of a clamping connection and is adjustable in the circumferential and/or axial direction upon contact with a stop body in the housing once the clamping force of the clamping connection has been overcome.

15 Claims, 3 Drawing Sheets

APPARATUS WITH AN INITIATOR

BACKGROUND OF THE INVENTION

This invention relates to an apparatus with an initiator for detecting the rotational position of a shaft comprising a housing containing an electric sensor element and a movable revolving body fastened on the shaft.

Such an apparatus, which is designed as an angle of rotation detecting element, is disclosed in German patent application No. DE-OS 31 33 061. The revolving body includes a ferromagnetic part, which changes the magnetic flux between a permanent magnet and a coil according to the angular position of rotation of the shaft. The coil is a component part of the sensor element, which is in stationary arrangement in the housing and has a high-frequency oscillating circuit, the feedback to the ferro-magnetic part being influenceable. The shaft has a thread and the revolving body is fixed on the shaft by means of a nut. In production and assembly, the revolving body with the ferromagnetic part must be aligned precisely both with respect to the shaft and also with respect to the magnet system with the permanent magnet and the coil. Due to the confined space in the housing, in practice difficulties are encountered in producing the screw connection and a correspondingly high production cost results. Furthermore, in practice considerable difficulties are often encountered during assembly of such an apparatus, for example on a geared motor or on a servo drive, in carrying out an exact adjustment on site according to the installation conditions such that, on reaching an end position, the necessary signal can also actually be generated. Finally, there is the risk that the screw connection will loosen in the course of time and consequently the function of the apparatus and associated parts of the system, will be questionable.

A coupling for transmitting rotational movements without backlash, in particular for precision rotary potentiometers, is disclosed in German patent application No. DE-OS 35 36 833. An input shaft and an output shaft each have a coupling lever rotationally fixed to them. For this purpose, in each case a clamping connection is provided which has two parts which can be braced against each other by a screw and nut. In order to set and fasten the respective coupling lever on the shaft, the screws must be loosened and retightened after corresponding adjustment of the coupling levers with respect to the shaft. The final rotationally fixed connection only takes place after exact positioning and adjustment of the coupling lever and subsequent tightening of the screw connection.

Finally, a sensor apparatus for the rotational position of the drive unit of a marine propulsion system is disclosed in U.S. Pat. No. 4,722,705. A position sensor with a lever which is fastened onto a shaft is provided in a housing. The end of the lever bears against a cam, the position of which changes, for example, according to the rudder position. The lever is pressed against the cam by means of a spring. The connection between the shaft and the lever is rotationally fixed, and no self-adjustment is possible.

SUMMARY OF THE INVENTION

It is the object of the invention to provide an apparatus for detecting the rotational position of a shaft in which a simple and functionally reliable alignment of a revolving body with respect to a sensor element can be carried out.

A further object of the invention is to provide an apparatus for detecting the rotational position of a shaft having a relatively uncomplicated structure.

Another object of the invention is to provide an apparatus for detecting the rotational position of a shaft having a space-saving and weight-saving design and which can be assembled and/or adjusted at low cost.

An additional object of the invention is to provide an apparatus for detecting the rotational position of a shaft designed in such a way that certain components can be standardized in the manner of a modular system, the sensor element and the revolving body being modified according to the configuration of the initiator.

A still further object of the invention is to provide an apparatus for detecting the rotational position of a shaft in which the revolving body can be fixed with respect to the shaft in the circumferential direction and/or in the axial direction in a simple way and without additional aids.

It is also an object of the present invention to provide an apparatus for detecting the rotational position of a shaft which can be subsequently adjusted without any difficulty, and optionally can be adjusted manually.

Yet another object of the invention is to provide an apparatus for detecting the rotational position of a shaft designed in such a way that, after an advance setting of the revolving body carried out at the factory, a quick and reliable self-adjustment can be performed following installation.

These and other objects of the invention are achieved by providing an apparatus with an initiator for detecting the rotational position of a shaft comprising a housing containing an electric sensor element and a movable revolving body fastened on the shaft, in which the revolving body is rotationally fixed to the shaft by a clamping connection, and the revolving body is adjustable with respect to the shaft once a retaining force predetermined by the clamping force of the clamping connection has been overcome, and a stop body for the revolving body is arranged in the housing in such a way that upon contact with the revolving body a self-adjustment of the position of the revolving body is effected, the shaft being rotated into a predetermined end position when the retaining force is overcome.

The proposed apparatus is distinguished by a simple design and makes possible a reliable and at the same time, if need be, easily adjustable setting of the revolving body with respect to the shaft. Due to the proposed clamping connection, the revolving body can be set in a simple way into the desired position in both the circumferential direction and the axial direction. A subsequent setting and adjustment may be carried out without any difficulty, taking into account the confined space and the small dimensions, without having to loosen and retighten any screws. The revolving body advantageously is formed of a plastic material which has an adequate elasticity to exert a clamping force on the shaft. In addition, a spring ring of spring steel preferably is arranged on the revolving body to exerts a clamping force on the shaft. The radial clamping force applied by the revolving body itself and/or by a spring element thereon is predetermined in such a way that, under normal operating conditions, a position once assumed by the revolving body on the shaft is maintained. If predetermined forces or torques are exceeded, however, the revolving body can be moved axially and/or circumferentially with respect to the shaft.

For self-adjustment of the revolving body, a stop body is provided, against which the revolving body can be brought into contact. Consequently, there are no problems in exactly predetermining both end positions (with 90° operating range) without external intervention. The stop body may be a separate component which advantageously is adjustably arranged on the base plate in the housing. The apparatus may be completely assembled at the factory and, after installation, the electric drive or the like is rotated in such a way that the revolving body bears against the stop body before the maximum angle of rotation, and thus the end position, is reached. If the shaft rotates further, the revolving body is held fast by means of the stop body, and the shaft can be moved into precisely the required end position. Within the scope of the invention, the stop body may be aligned in a defined position with respect to the initiator in order that, on reaching the end position, the required electric signal is emitted. When in contact with the stop body, the revolving body may, if need be, be adjusted in the circumferential direction or in the axial direction with respect to the shaft. For axial adjustment, the revolving body may be provided with a thread or a sloping surface which is in engagement with a corresponding thread or sloping surface on the shaft. Once the revolving body comes into contact with the stop body, further rotation of the shaft thus not only effects a change in the rotational position of the revolving body, but also in its axial position.

The sensor element or elements are arranged on a base plate which is connected in a suitable manner, particularly by means of screws, to the housing. The base plate, and similarly the housing bottom, have aligned bores, through which the shaft is introduced from outside into the interior of the housing. A self-sealing guide bush may be provided in the housing for introduction of the shaft. The stop body and electrical connecting elements of the initiator are arranged on the base plate. Furthermore, different types of initiators may be arranged on the same base plate, reference being made in particular to limit switches, proximity initiators or slot-type initiators. The same base plate and the same housing, including the housing cover, can be used in each case for the various designs; quite considerable cost advantages being achieved due to such a modular system. Within the scope of the invention, the same revolving body is used for the various initiators, with suitable lugs or the like merely being provided and fastened on the plastic part of the revolving body.

In one preferred embodiment, a guide bush for the shaft is arranged in the bottom of the housing. A sealing ring is also advantageously arranged in the guide bush, so that there is at least a splash-proof seal. The axial securing of the shaft against slipping out of the housing is effected by means of retaining rings fitted on the shaft inside and outside the housing. Due to the clamping connection, an axial setting of the revolving body can be carried out without any difficulty, and the adjustment dependent on the angle of rotation is carried out subsequently by means of the stop body. A good axially parallel alignment of the shaft in the housing is ensured by means of the guide bush.

BRIEF DESCRIPTION OF THE DRAWINGS

The invention will be explained in further detail hereinafter with reference to exemplary embodiments illustrated in the accompanying drawings, in which.

DETAILED DESCRIPTION OF PREFERRED EMBODIMENTS

Figure 1:
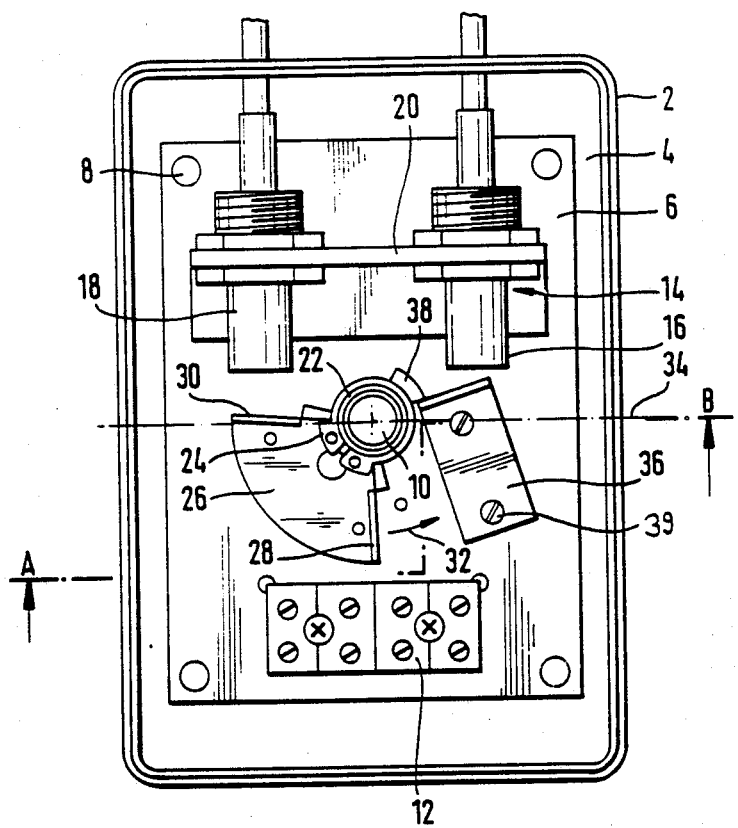
FIG. 1 shows a plan view of an apparatus according to the invention with a proximity initiator.

FIG. 1 shows a view of an upwardly open housing 2, in the interior 4 of which a base plate 6 is fastened by means of screws 8. In the center of the housing, a shaft 10 can be seen, which is introduced from below into the interior 4 of housing 2.

On the base plate 6 there is arranged a contact strip 12, to which electric lines can be connected in conventional manner. Furthermore, on the base plate 6 there is an electric sensor element 14, which includes two conventional proximity initiators 16, 18. These proximity initiators 16, 18 are mounted on an angle plate 20, which is screwed to the base plate 6.

A revolving body 22 is rotationally fixed on shaft 10 by means of a clamping connection. The clamping force is additionally and/or alternatively applied by a spring ring 24. The revolving body 22 advantageously is formed of a plastic material which has an adequate elasticity to exert a clamping force, and the inside diameter of the revolving body is preferably mated with a press fit onto the outside diameter of the shaft 10. The clamping force is predetermined in a defined manner, so that, after overcoming a certain retaining force, the revolving body 22 can be aligned with respect to the shaft 10 in the circumferential direction and also in the axial direction.

A metal switching lug 26, designed in the form of a sector and extending over an angular range of 90°, is fastened to the revolving body 22. At each of the two ends of lug 26 there is a part 28, 30, bent upwards in such a way that it projects at right angles to the base plate 6. These parts 28, 30 are axially on the same level as the two proximity initiators 16, 18. One of the two end positions is illustrated in which part 30 interacts with proximity initiator 18. If the shaft 10 is rotated in the direction of the arrow 32, the state of the initiator 18 changes and a corresponding signal is given. If the lug part 28 reaches the other end position, indicated by the broken line 34, the other proximity initiator 16 is correspondingly actuated to give an electric signal. The electronics used for signal generation and transmission are conventional and therefore will not be described here in any further detail.

Also arranged on the base plate 6 is a stop body 36, which interacts with a cam 38 on revolving body 22. The stop body 36 is arranged in a defined position by means of screws 39 on the base plate 6. During manufacture, the revolving body 22 with the lug 26 is simply pushed onto the shaft 10 without any exact adjustment of its rotational position taking place. A coarse setting advantageously may be performed by means of the screws 39. Once the apparatus has been connected in a suitable way at the point of use to a positioning motor or the like, the shaft 10 is rotated in such a way that the cam 38 bears against the stop body 36, as shown in FIG. 1. On further rotation of the shaft counter to the direction of the arrow 32, the clamping force is overcome, and the revolving body 22 is held firm in this position by the stop body 36 until the actual end position of the positioning motor is reached. It is evident that even installation inaccuracies and the like can thereby be corrected without any difficulty, without an installer having to undertake a laborious setting of the lug 26.

Figure 2:
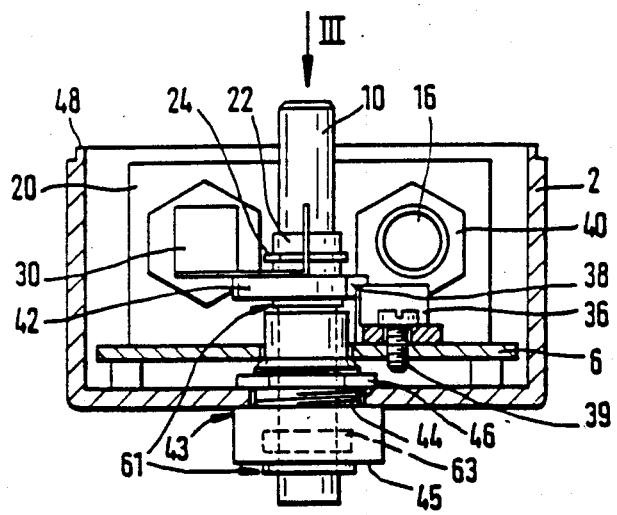
FIG. 2 shows a sectional view taken along line A-B of FIG. 1.

FIG. 2 shows a partial sectional view of the housing 2 and the shaft 10, in which the arrangement of the initiators 16, 18 on the angle plate 20 can be seen. The initiators 16, 18 are screwed by means of hex nuts 40 to the angle plate 20. Corresponding hex nuts are arranged on the rear of angle plate 20. The initiators 16, 18 can consequently be positioned exactly, in order to deliver the desired signals in the end positions of the revolving body or its lug. In the position shown, the upwardly bent part 30 of lug 26 is right in front of the initiator 18. The revolving body 22 has a small flange 42 on which the lug 26 is fastened, as already described above, by means of rivets. In accordance with the invention, the apparatuses for different initiators are preferably basically the same; only the lugs or cams being correspondingly designed, but the revolving bodies 22 being the same. The cam 38 bearing against the stop body 36 is likewise easily visible. The shaft 10 has a comparably small diameter. It should be noted that, with screw connections, the shaft must, as is known, have a relatively large diameter in order to fix the revolving body reliably on the shaft by means of a central screw and to fix the lugs coaxially to the shaft or exactly in axial planes. The apparatus according to the invention, on the other hand, only requires a small unit volume and allows cost-effective use of particularly small housings.

The shaft 10 is introduced from below through a guide bush 43, which is fixed in a bore 44 in the bottom of the housing 2. Guide bush 43 is axially secured by means of a retaining ring or hex nut 46 in the interior of housing 2, which bears against the bottom of the housing; on the outside, the guide bush 43 has a corresponding collar 45. A cover 50 (see FIG. 3) may be arranged on the upper edge 48 of the housing 2 to tightly close off the housing 2 at the top, if desired via a seal. Shaft 10 is axially secured in guide bush 43 by means of revolving body 22 and/or retaining washers 61. The guide bush 43 makes possible a defined axially parallel alignment of the shaft 10. After the apparatus is connected to a positioning motor or the like, the self-adjustment takes place by actuation of the drive into its two end positions. In the guide bush 43 there is a sealing ring 63, which bears in a sealing manner against the shaft 10.

Figure 3:
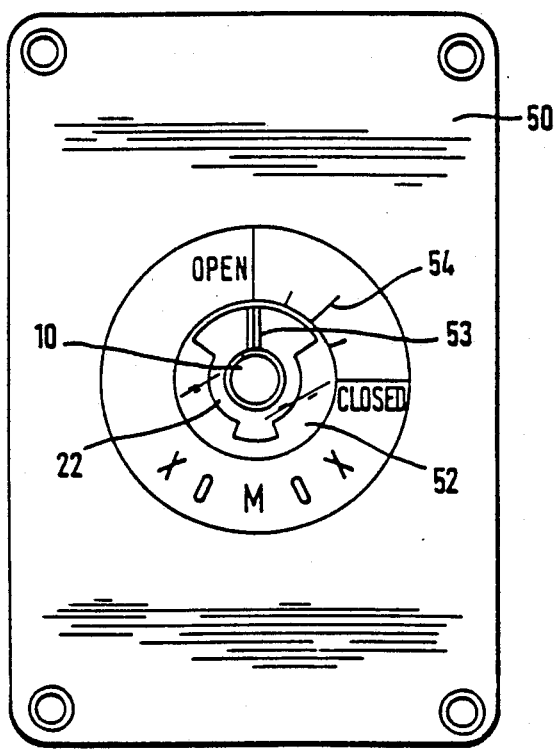
FIG. 3 shows a plan view of the cover viewed in the direction of arrow III of FIG. 2.

FIG. 3 shows a plan view of the cover 50, viewed in the direction of arrow III in FIG. 2. Cover 50 includes a window 52 in the center through which, within the scope of the invention, the revolving body 22 can be partially seen. The window may be made of glass or a transparent plastic. On its outside surface, the cover 50 has markings 54, so that the respective rotational position can be readily visually determined. Furthermore, an additional, similar revolving body, provided with an indicator mark 53, may additionally be fitted in mirror-image fashion on shaft 10 above revolving body 22, in order to indicate the rotational position of the shaft 10 in conjunction with the markings 54.

Figure 4:
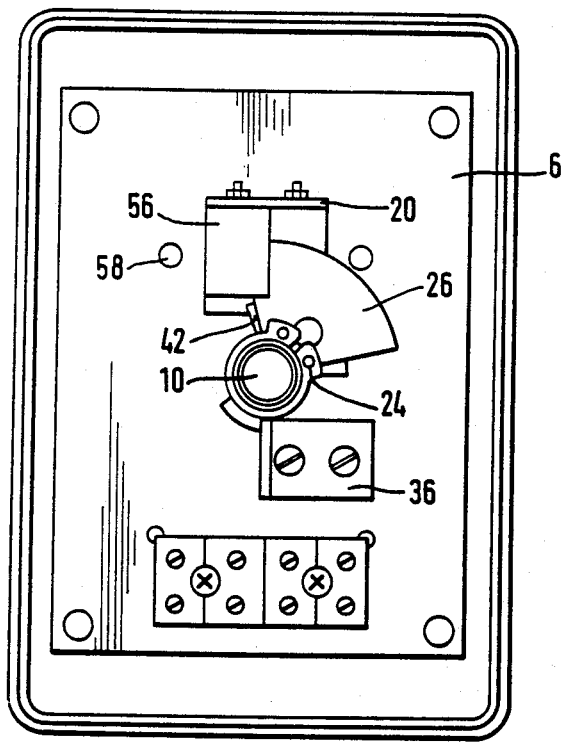
FIG. 4 shows a plan view of an embodiment with a slot-type initiator.

FIG. 4 shows an embodiment with a slot-type initiator 56, which is fastened with a small angle plate 20 on the base plate 6. Bores 58 can be seen here, by means of which the larger angle plate in the embodiment illustrated in FIGS. 1 and 2 was fastened on the base plate 6. The same base plates 6 and the same housings 2 together with covers are used for all embodiments. As is known, the slot-type initiator 56 has a slot in a plane parallel to the plane of the drawing in which slot the lug 26 engages when shaft 10 is rotated. In this embodiment, lug 26 does not include any upwardly bent parts at its ends. Otherwise, however, the lug 26 is connected in the same way to the revolving body 22, which in turn is rotationally fixed, by means of the clamping connection described above, to the shaft 10 for normal operation.

Figure 5:
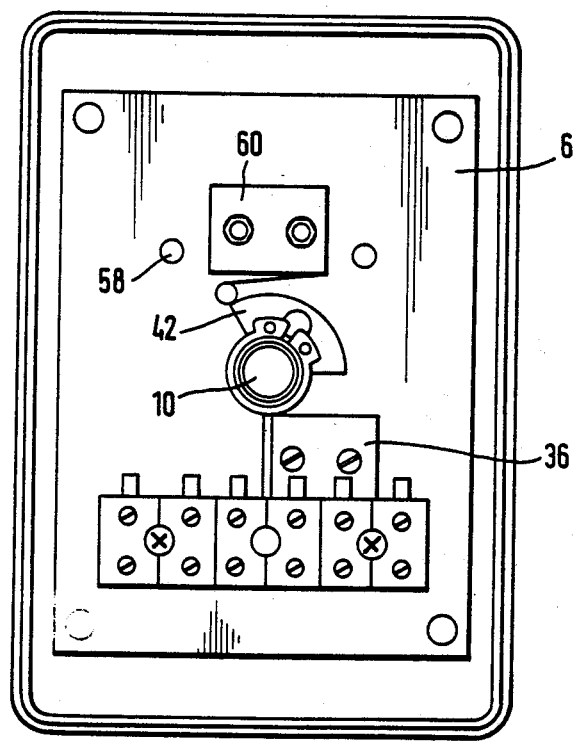
FIG. 5 shows a plan view of an embodiment with a microswitch.

Finally, FIG. 5 shows an embodiment in which a microswitch 60 is arranged on the base plate 6 as the initiator. In this embodiment, the revolving body is not provided with a lug; instead the cam or flange 42 described above actuates the microswitch 60 directly. As can be seen, the flange 42 is precisely shaped in the form of a sector and in this way serves to actuate the microswitch. The same revolving body is used provided with a lug for triggering of the initiators.

The foregoing description and examples have been set forth merely to illustrate the invention and are not intended to be limiting. Since modifications of the disclosed embodiments incorporating the spirit and substance of the invention may occur to persons skilled in the art, the scope of the invention should be limited solely with reference to the appended claims and equivalents.

What is claimed is:

1. An apparatus with an initiator for detecting the rotational position of a shaft comprising a housing containing an electric sensor element of said initiator and a movable revolving body fastened on said shaft, wherein said revolving body is rotationally fixed directly to said shaft by a clamping connection and completely surrounds the periphery of said shaft, and said revolving body is adjustable with respect to said shaft once a retaining force determined by the clamping force of said clamping connection has been overcome, and a stop body for said revolving body is arranged in said housing in such a way that upon contact with said revolving body a self-adjustment of the positioning of said revolving body can be carried out, said shaft being rotated into a predetermined end position when said retaining force is overcome.

2. Apparatus according to claim 1, wherein said revolving body is adjustable with respect to said shaft in at least one of the axial direction and the circumferential direction, and said revolving body has a cam such that, upon contact with said stop body, said revolving body is adjusted in at least one of said directions.

3. Apparatus according to claim 2, wherein said cam is located on a radial plane of said revolving body.

4. Apparatus according to claim 1, wherein said revolving body is formed of resiliently elastic plastic material and has a flange, on which a switching lug which interacts with said sensor element is fastened.

5. Apparatus according to claim 4, wherein said revolving body is provided with a spring element which biases said revolving body radially against said shaft.

6. Apparatus according to claim 1, wherein at least one of said sensor element, said stop body and a contact strip are arranged on a base plate fastened in said housing, and wherein said base plate and said housing are used in each case for different sensor elements.

7. Apparatus according to claim 1, wherein said housing is provided with a guide bush for said shaft.

8. Apparatus according to claim 7, wherein said guide bush is provided with a sealing ring for said shaft.

9. Apparatus according to claim 7, wherein said guide bush is secured in its axial direction aligned with a bore in said housing by means of a collar located outside said housing and a retaining ring or nut located inside said housing.

10. Apparatus according to claim 7, wherein said shaft is adjustable in its axial direction with respect to at least one of said housing and said guide bush.

11. Apparatus according to claim 10, wherein said shaft is secured axially by means of said revolving body.

12. Apparatus according to claim 1, wherein said housing has a cover with a window through which said revolving body can be seen.

13. Apparatus according to claim 12, wherein an indicator mark is provided which can be seen through said window to visually determine the rotational position of said revolving body.

14. Apparatus according to claim 1, wherein said stop body is adjustably arranged in said housing by means of screws via said base plate.

15. Apparatus according to claim 1, wherein said stop body is mounted on a base plate, and said base plate comprises a bore through which said shaft is extended.

* * * * *